Dec. 8, 1959  J. E. ANDERSON  2,916,679

TANK UNIT

Filed April 30, 1954

INVENTOR.
JOHN EDWARD ANDERSON
BY
George H. Fisher
ATTORNEY

United States Patent Office 2,916,679
Patented Dec. 8, 1959

2,916,679

TANK UNIT

John Edward Anderson, Minneapolis, Minn., assignor to Minneapolis-Honeywell Regulator Company, Minneapolis, Minn., a corporation of Delaware Application April 30, 1954, Serial No. 426,678

1 Claim. (Cl. 317—246)

The present invention is concerned with the impedance probe for use with a liquid level sensing system. More particularly, the present invention is concerned with an improved capacitance type tank unit for use in a capacitance bridge type liquid level sensing system.

The capacitance type liquid level sensing system has found wide acceptance in the aviation fuel gage art. It is desirable to have accurate measurement of fuel in an aircraft so that the extra fuel carried as a safety factor can be reduced to a minimum and the pay load of the craft thereby increased. The capacitance type impedance probe to be used in this system must be as light as practically possible and must be of sufficient strength to withstand the environment to which the tank unit is subjected. For example, it has been found that excessive vibration tends to damage the tank unit. This is especially so when the tank is empty and the tank unit is no longer surrounded by fuel to, in a sense, damp the vibrations.

It is the purpose of the present invention to provide a tank unit which is constructed to withstand vibration.

It is a further object of the present invention to provide a tank unit having a probe member and a mounting member with a yieldable means biasing the probe and the mounting member to allow relative movement under the bias of the yieldable means and thereby reduce vibration.

These and other objects of the present invention will become apparent to those skilled in the art upon reference to the specification, claims, and drawings, of which:

Figure 1:
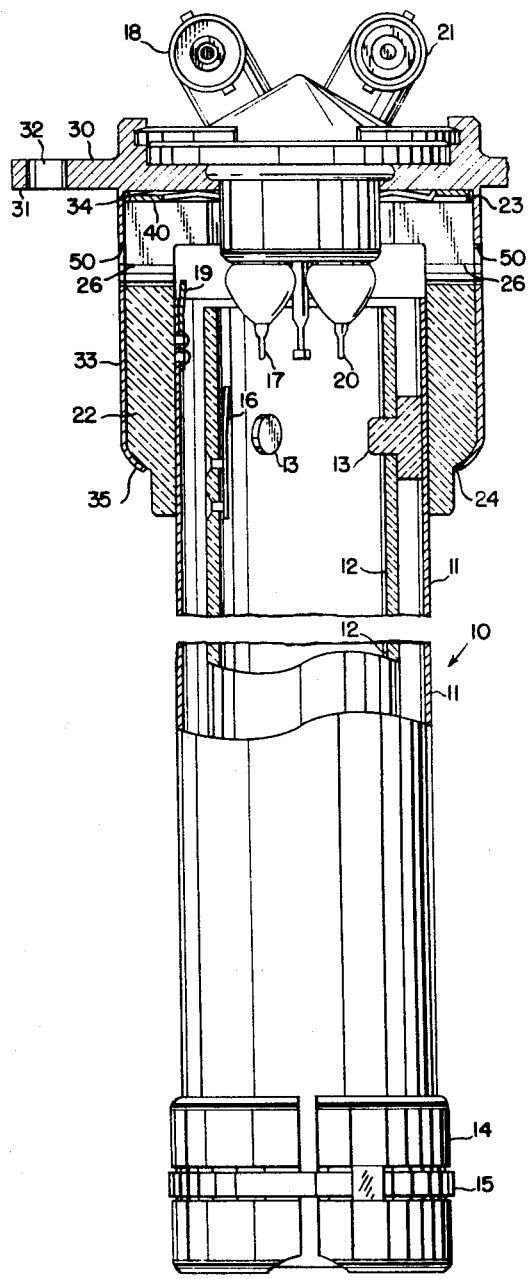
Figure 1 is a showing of the improved tank unit, partly in section.

Referring to Figure 1, the capacitance type liquid level sensing impedance probe is designated generally by the reference numeral 10. This probe comprises an outer electrode 11, and an inner electrode 12. The electrodes 11 and 12 are spaced relative to each other by insulators 13. Insulators 13 are also provided at the bottom of the probe; however, they are not shown in Figure 1.

An insulator 14 is provided encircling the bottom portion of the probe, with a metallic hose-like clamp 15 encircling insulator 14. The bottom of the probe 10 is open to allow liquid to rise and fall in the probe.

The inner electrode 12 is connected to a terminal 16 and then by means of a wire, not shown, to a terminal 17, which terminal is internally connected to a connector 18. The outer electrode 11 is connected to a terminal 19 which is connected by means of a wire, not shown, to a terminal 20, which terminal is connected to a connector 21.

A cylindrically shaped insulator 22 is provided and encircles the upper end of the probe 10. Insulator 22 is fixed to probe 10 by any conventional method, for example, by gluing. This insulator is formed having a substantially flat surface 23 on the top edge thereof and having a shoulder 24 formed at the bottom thereof. A plurality of channels 26 are provided to allow liquid to flow into the capacitance probe 10, it being remembered that the capacitance probe is also open at the bottom end thereof.

A metallic mounting means is designated by the reference numeral 30 and has a first portion comprising a substantially flat shoulder 31. The shoulder 31 has a plurality of openings 32 drilled therein to receive bolts which mount the tank unit to the tank containing fuel or liquids the level of which is to be measured.

The mounting means 30 also has a cup-shaped portion 33 having a substantially flat surface 34 forming the bottom of the cup and an annular flange 35 which engages the annular shoulder 24 on insulator 22. Cup portion 33 has a plurality of openings 50 formed therein. These openings mate with the openings 26 in insulator 22.

Figure 2:
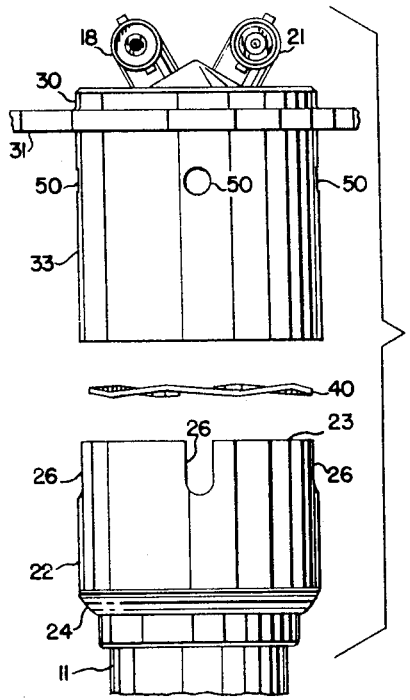
Figure 2 is an exploded view of a portion of the tank unit of Figure 1.

It will be noted that in Figure 2 the cup-shaped portion 33 does not have the annular shoulder 35 formed. This shoulder is formed after spring 40 and insulator 22 are inserted into the cup.

Spaced between the surface 34 forming the bottom of the cup and the surface 23 of insulator 22 is a biased spring means 40. This spring may be of any shape. Shoulder 35 is formed on the cup-shaped member 33 so that the spring 40 is put under tension and biases insulator 22 to press annular shoulder 24 against the annular flange 35. Therefore, it can be seen that relative movement can take place between the metallic mounting member 30 and the insulator 22 under the bias of spring 40.

Without this spring, or in other words, if insulator 22 were rigidly fixed to the metallic mounting means 30 as was done in the prior art, any vibration set up in the member 30 would be directly transmitted to the probe 10. The probe 10 then must be made mechanically strong enough to withstand this vibration and thereby the weight of the probe is increased. With the present invention the improved construction of the tank unit isolates the probe 10 from vibration which may take place in the mounting means 30.

Other modifications of the present invention will be apparent to those skilled in the art and it is intended that the present invention be limited solely by the scope of the appended claim.

I claim as my invention:

A tank unit for use in a liquid level system comprising, in combination: a capacitive probe comprising inner and outer cylindrical electrodes concentrically disposed; cylindrical insulator means fixed to a first end of said outer electrode and having a curved annular shoulder formed thereon; mounting means having a substantially flat portion and a cup-shaped portion, said cup-shaped portion encircling said insulator and engaging said annular shoulder; biased spring means in said cup-shaped portion engaging said insulator and said mounting means allowing relative movement between said mounting member and said insulator; and electrical connection means connected to said inner and outer electrodes extending through said mounting means.

References Cited in the file of this patent

UNITED STATES PATENTS

| | | |
|---|---|---|
| 2,275,490 | Barber | Mar. 10, 1942 |
| 2,560,757 | Bowar | July 17, 1951 |
| 2,574,191 | Platzer | Nov. 6, 1951 |
| 2,578,608 | Shull | Dec. 11, 1951 |
| 2,578,933 | Hunter | Dec. 18, 1951 |
| 2,582,363 | Thiry | Jan. 15, 1952 |
| 2,582,399 | Smith | Jan. 15, 1952 |
| 2,649,271 | Gosselin | Aug. 18, 1953 |
| 2,728,546 | De Giers | Dec. 27, 1955 |